US011917571B2

(12) United States Patent
Da et al.

(10) Patent No.: US 11,917,571 B2
(45) Date of Patent: Feb. 27, 2024

(54) LOCATING METHOD FOR UPLINK TIME DIFFERENCE OF ARRIVAL, AND APPARATUS THEREOF

(71) Applicant: DATANG MOBILE COMMUNICATIONS EQUIPMENT CO., LTD., Beijing (CN)

(72) Inventors: Ren Da, Beijing (CN); Fang-Chen Cheng, Beijing (CN); Hui Li, Beijing (CN); Haiyang Quan, Beijing (CN); Bin Ren, Beijing (CN); Xueyuan Gao, Beijing (CN); Qiubin Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 496 days.

(21) Appl. No.: 17/284,383

(22) PCT Filed: Sep. 30, 2019

(86) PCT No.: PCT/CN2019/109569
§ 371 (c)(1),
(2) Date: Apr. 9, 2021

(87) PCT Pub. No.: WO2020/073876
PCT Pub. Date: Apr. 16, 2020

(65) Prior Publication Data
US 2021/0337496 A1 Oct. 28, 2021

(30) Foreign Application Priority Data

Oct. 12, 2018 (CN) .......................... 201811191693.1

(51) Int. Cl.
*H04W 56/00* (2009.01)
*H04W 16/28* (2009.01)
*H04W 24/10* (2009.01)

(52) U.S. Cl.
CPC ......... *H04W 56/006* (2013.01); *H04W 16/28* (2013.01); *H04W 24/10* (2013.01); *H04W 56/005* (2013.01)

(58) Field of Classification Search
CPC ... H04W 56/006; H04W 16/28; H04W 24/10; H04W 56/005
See application file for complete search history.

(56) References Cited

U.S. PATENT DOCUMENTS

2008/0088506 A1* 4/2008 Fischer ................... G01S 19/05
455/12.1
2014/0080503 A1 3/2014 Issakov et al.
(Continued)

FOREIGN PATENT DOCUMENTS

| CN | 102573060 A | 7/2012 |
| CN | 103024757 A | 4/2013 |

(Continued)

OTHER PUBLICATIONS

International Search Report for International Application No. PCT/CN2019/109569 dated Dec. 27, 2019.
(Continued)

*Primary Examiner* — Brenda H Pham
(74) *Attorney, Agent, or Firm* — Meunier Carlin & Curfman LLC

(57) ABSTRACT

Disclosed in the present application are a locating method for an uplink time difference of arrival, and an apparatus thereof. The method comprises: a locating server transmits a UTDOA information request message to a serving base station of a target terminal; the locating server receives a UTDOA information response message sent by the serving base station, wherein the UTDOA information response message carries configuration information of a locating reference signal and beam information of a reference signal related the a target terminal; the locating server transmits a measurement information request message to a location measurement unit, wherein the measurement information
(Continued)

request message carries auxiliary locating information, the auxiliary locating information comprises the beam information of the reference signal related to the target terminal, or comprises relative information between a transmitting beam of the locating reference signal determined according to the beam information of the reference signal related to the target terminal and a received beam used by the location measurement unit, so that the location measurement unit and the locating server can assist in locating by using the beam information.

20 Claims, 5 Drawing Sheets

(56) References Cited

U.S. PATENT DOCUMENTS

| | | | | |
|---|---|---|---|---|
| 2015/0036519 | A1* | 2/2015 | Kazmi | H04L 5/1469 370/252 |
| 2015/0215793 | A1 | 7/2015 | Siomina et al. | |
| 2015/0223185 | A1* | 8/2015 | Harris | H04W 52/0206 455/456.5 |
| 2016/0150574 | A1* | 5/2016 | Edge | H04L 65/1016 455/404.2 |
| 2017/0288897 | A1 | 10/2017 | You et al. | |

FOREIGN PATENT DOCUMENTS

| | | |
|---|---|---|
| CN | 107852582 A | 3/2018 |
| WO | 2017164925 A1 | 9/2017 |
| WO | 2017223301 A1 | 12/2017 |

OTHER PUBLICATIONS

CATT, "UL Reference Signals for NR Positioning" 1-34 3GPP TSG RAN WGJ Meeting #97 RI-1906306, May 4, 2019.

* cited by examiner

LOCATING METHOD FOR UPLINK TIME DIFFERENCE OF ARRIVAL, AND APPARATUS THEREOF

CROSS-REFERENCE OF RELATED APPLICATIONS

The application is a US National Stage of International Application No. PCT/CN2019/109569, filed Sep. 30, 2019, which claims priority to Chinese Patent Application No. 201811191693.1, filed with the Chinese Patent Office on Oct. 12, 2018 and entitled "Locating Method for Uplink Time Difference of Arrival, and Apparatus thereof", which is hereby incorporated by reference in its entirety.

FIELD

The application relates to the field of wireless communication technology, and in particular to a locating method for an uplink time difference of arrival, and an apparatus thereof.

BACKGROUND

The Uplink Time Difference of Arrival (UTDOA) is a locating method defined in the 3GPP protocol. The basic principle of UTDOA locating is: a base station configures a user equipment (User Equipment (UE)) with resources for transmitting a Sounding Reference Signal (SRS) for locating; the user equipment transmits the SRS according to the configuration of the SRS; and a locating server arranges a plurality of Location Measurement Units (LMUs) to simultaneously measure the difference between the uplink arrival time of the SRS to the LMU and the LMU's own time, which is called UL Relative Time Of Arrival (UL RTOA). The time required for the SRS transmitted by the UE to reach each LMU is proportional to the length of the transmission path between the UE and each LMU. Subsequently, each LMU reports the UL RTOA measurement value to the locating server in the network. Finally, the locating server estimates the location of the UE based on the UL RTOA measurement value reported by each LMU.

In the UTDOA locating process, the UTDOA information, such as SRS configuration information, UL RTOA measurement values, etc., needs to be exchanged among the base station, LMU and locating server. The LMU measures the SRS transmitted by the UE based on the SRS configuration information to obtain the UL RTOA measurement value.

Currently, the information on which the UE locating relies is limited, and the locating performance or accuracy of the UE needs to be improved.

SUMMARY

The embodiments of the application provide a locating method for an uplink time difference of arrival, and an apparatus thereof.

In a first aspect, a locating method for an uplink time difference of arrival is provided. The method includes: transmitting, by a locating server, a UTDOA information request to a serving base station of a target user equipment; wherein the UTDOA information request is used to request the serving base station to configure resources of a location reference signal for the target user equipment and transmit configuration information of the location reference signal to the locating server; receiving, by the locating server, a UTDOA information response transmitted by the serving base station, wherein the UTDOA information response carries the configuration information of the location reference signal and beam information of a reference signal related to the target user equipment; transmitting, by the locating server, a measurement request to a location measurement unit, wherein the measurement request carries assistance locating information; wherein the assistance locating information includes the beam information of the reference signal related to the target user equipment, or includes relative information between a transmitting beam of the location reference signal and a receiving beam used by the location measurement unit determined according to the beam information of the reference signal related to the target user equipment; receiving, by the locating server, a measurement response transmitted by the location measurement unit, wherein the measurement response carries locating measurement information of the target user equipment and measured beam information of the location reference signal, and the locating measurement information is obtained by the location measurement unit through measuring the location reference signal transmitted by the target user equipment according to the assistance locating information; and locating, by the locating server, the target user equipment according to the locating measurement information and the measured beam information of the location reference signal carried in the measurement response.

In a possible implementation, the beam information of the reference signal related to the target user equipment includes transmitting beam information of the location reference signal and at least one of: beam information of a downlink reference signal measured by the target user equipment, and beam information of an uplink reference signal transmitted by the target user equipment and measured by the serving base station.

In a possible implementation, after the locating server receives the UTDOA information response transmitted by the serving base station, the method further includes: determining, by the locating server, a location measurement unit for detecting the location reference signal transmitted by the target user equipment according to the beam information of the downlink reference signal measured by the target user equipment.

In a possible implementation, after the locating server receives the UTDOA information response transmitted by the serving base station, the method further includes: determining, by the locating server, a location measurement unit for detecting the location reference signal transmitted by the target user equipment according to the beam information of the uplink reference signal transmitted by the target user equipment measured by the serving base station.

In a possible implementation, the UTDOA information request carries receiving beam information used by the location measurement unit to detect the location reference signal.

In a possible implementation, the beam information includes one or more of: beam identifier, beam direction, beam width, and beam intensity.

In a possible implementation, the location reference signal is a Sounding Reference Signal (SRS).

In a second aspect, a locating method for an uplink time difference of arrival is provided. The method includes: receiving, by a serving base station of a target user equipment, a UTDOA information request transmitted by a locating server, wherein the UTDOA information request is used to request to configure resources of a location reference signal for the target user equipment and transmit configuration information of the location reference signal to the locating server; configuring, by the serving base station, the resources of the location reference signal for the target user equipment; and transmitting, by the serving base station, a UTDOA information response to the locating server, wherein the UTDOA information response carries the configuration information of the location reference signal and beam information of a reference signal related to the target user equipment, and the configuration information of the location reference signal and the beam information of the reference signal related to the target user equipment are used to locate the target user equipment.

In a possible implementation, the beam information of the reference signal related to the target user equipment includes transmitting beam information of the location reference signal and at least one of: beam information of a downlink reference signal measured by the target user equipment, and beam information of an uplink reference signal transmitted by the target user equipment and measured by the serving base station.

In a possible implementation, the UTDOA information request carries receiving beam information used by the location measurement unit to detect the location reference signal; and configuring, by the serving base station, the resources of the location reference signal for the target user equipment, includes: configuring, by the serving base station, the resources of the location reference signal for the target user equipment according to the receiving beam information used by the location measurement unit to detect the location reference signal.

In a possible implementation, the beam information includes one or more of: beam identifier, beam direction, beam width, and beam intensity.

In a possible implementation, the location reference signal is an SRS.

In a third aspect, a locating method for an uplink time difference of arrival is provided. The method includes: receiving, by a location measurement unit, a measurement request transmitted by a locating server, wherein the measurement request carries assistance locating information; wherein the assistance locating information includes beam information of a reference signal related to a target user equipment, or includes relative information between a transmitting beam of the location reference signal and a receiving beam used by the location measurement unit determined according to the beam information of the reference signal related to the target user equipment; measuring, by the location measurement unit, the location reference signal transmitted by the target user equipment according to the assistance locating information to obtain locating measurement information of the target user equipment; and transmitting, by the location measurement unit, a measurement response to the locating server, wherein the measurement response carries the locating measurement information of the target user equipment and measured beam information of the location reference signal.

In a possible implementation, after the location measurement unit receives the measurement request transmitted by the locating server, the method further includes: determining, by the location measurement unit, receiving beam information of the location reference signal according to transmitting beam information of the location reference signal carried in the measurement request.

In a possible implementation, the beam information of the reference signal related to the target user equipment includes transmitting beam information of the location reference signal and at least one of: beam information of a downlink reference signal measured by the target user equipment, and beam information of an uplink reference signal transmitted by the target user equipment and measured by the serving base station.

In a possible implementation, the beam information includes one or more of: beam identifier, beam direction, beam width, and beam intensity.

In a possible implementation, the location reference signal is an SRS.

In a fourth aspect, a locating server is provided. The locating server includes: a first transmitting module configured to transmit a UTDOA information request to a serving base station of a target user equipment; wherein the UTDOA information request is used to request the serving base station to configure resources of a location reference signal for the target user equipment and transmit configuration information of the location reference signal to the locating server; a first receiving module configured to receive a UTDOA information response transmitted by the serving base station, wherein the UTDOA information response carries the configuration information of the location reference signal and beam information of a reference signal related to the target user equipment; a second transmitting module configured to transmit a measurement request to a location measurement unit, wherein the measurement request carries assistance locating information; wherein the assistance locating information includes the beam information of the reference signal related to the target user equipment, or includes relative information between a transmitting beam of the location reference signal and a receiving beam used by the location measurement unit determined according to the beam information of the reference signal related to the target user equipment; a second receiving module configured to receive a measurement response transmitted by the location measurement unit, wherein the measurement response carries locating measurement information of the target user equipment and measured beam information of the location reference signal, and the locating measurement information is obtained by the location measurement unit through measuring the location reference signal transmitted by the target user equipment according to the assistance locating information; and a processing module configured to locate the target user equipment according to the locating measurement information and the measured beam information of the location reference signal carried in the measurement response.

Optionally, the beam information of the reference signal related to the target user equipment includes transmitting beam information of the location reference signal and at least one of: beam information of a downlink reference signal measured by the target user equipment, and beam information of an uplink reference signal transmitted by the target user equipment and measured by the serving base station.

Optionally, after the first receiving module receives the UTDOA information response transmitted by the serving base station, the processing module determines a location measurement unit for detecting the location reference signal transmitted by the target user equipment according to the beam information of the downlink reference signal measured by the target user equipment.

Optionally, after the first receiving module receives the UTDOA information response transmitted by the serving base station, the processing module determines a location measurement unit for detecting the location reference signal transmitted by the target user equipment according to the beam information of the uplink reference signal transmitted by the target user equipment and measured by the serving base station.

Optionally, the UTDOA information request carries receiving beam information used by the location measurement unit to detect the location reference signal.

In a fifth aspect, a base station is provided. The base station includes: a receiving module configured to receive a UTDOA information request transmitted by a locating server, wherein the UTDOA information request is used to request to configure resources of a location reference signal for a target user equipment and transmit configuration information of the location reference signal to the locating server; a processing module configured to configure the resources of the location reference signal for the target user equipment; and a transmitting module configured to transmit a UTDOA information response to the locating server, wherein the UTDOA information response carries the configuration information of the location reference signal and beam information of a reference signal related to the target user equipment, and the configuration information of the location reference signal and the beam information of the reference signal related to the target user equipment are used to locate the target user equipment.

Optionally, the beam information of the reference signal related to the target user equipment includes transmitting beam information of the location reference signal and at least one of: beam information of a downlink reference signal measured by the target user equipment, and beam information of an uplink reference signal transmitted by the target user equipment and measured by the serving base station.

Optionally, the UTDOA information request carries receiving beam information used by the location measurement unit to detect the location reference signal. The processing module is configured to: configure the resources of the location reference signal for the target user equipment according to the receiving beam information used by the location measurement unit to detect the location reference signal.

In a sixth aspect, a location measurement unit is provided. The location measurement unit includes: a receiving module configured to receive a measurement request transmitted by a locating server, wherein the measurement request carries assistance locating information; wherein the assistance locating information includes beam information of a reference signal related to a target user equipment, or includes relative information between a transmitting beam of the location reference signal and a receiving beam used by the location measurement unit determined according to the beam information of the reference signal related to the target user equipment; a processing module configured to measure the location reference signal transmitted by the target user equipment according to the assistance locating information to obtain locating measurement information of the target user equipment; and a transmitting module configured to transmit a measurement response to the locating server, w % herein the measurement response carries the locating measurement information of the target user equipment and measured beam information of the location reference signal.

Optionally, after the receiving module receives the measurement request transmitted by the locating server, the processing module is further configured to: determine receiving beam information of the location reference signal according to transmitting beam information of the location reference signal carried in the measurement request.

Optionally, the beam information of the reference signal related to the target user equipment includes transmitting beam information of the location reference signal and at least one of: beam information of a downlink reference signal measured by the target user equipment, and beam information of an uplink reference signal transmitted by the target user equipment and measured by the serving base station.

In a seventh aspect, a communication device is provided. The communication device includes: a processor and a memory; wherein the processor is configured to read computer instructions in the memory to execute the method as described in any one of the first aspect described above.

In an eighth aspect, a communication device is provided. The communication device includes: a processor, a memory and a transceiver; wherein the processor is configured to read computer instructions in the memory to execute the method as described in any one of the second aspect described above.

In a ninth aspect, a communication device is provided. The communication device includes: a processor and a memory; wherein the processor is configured to read computer instructions in the memory to execute the method as described in any one of the third aspect described above.

In a tenth aspect, a computer readable storage medium storing computer executable instructions is provided, where the computer executable instructions are configured to cause the computer to execute the method as described in any one of the first aspect described above; or the computer executable instructions are configured to cause the computer to execute the method as described in any one of the second aspect described above; or the computer executable instructions are configured to cause the computer to execute the method as described in any one of the third aspect described above.

In the above embodiments of the application, the serving base station transmits the beam information of the reference signal related to the target user equipment to the locating server, and transmits it to the location measurement unit through the locating server, thereby helping the location measurement unit to measure the location reference signal transmitted by the target user equipment, and thus improving the locating accuracy or performance.

DETAILED DESCRIPTION

In the following, some terms in the embodiments of the application are explained so as to facilitate the understanding of those skilled in the art.

(1) In the embodiments of the application, the nouns "network" and "system" are often used alternately, but those skilled in the art may understand the meaning thereof.

(2) The term "a plurality of" in the embodiments of the application refers to two or more, and other quantifiers are similar thereto.

(3) "and/or" describes the association relationship of the associated objects, and indicates that there may be three relationships, for example, A and/or B may represent: only A, both A and B, and only B. The character "/" generally indicates that the associated objects have a kind of "or" relationship.

The embodiments of the application provide a method and apparatus for assisting in the UTDOA locating based on the beam information of uplink and downlink reference signals (such as Downlink Reference Signal (DL-RS), Uplink Reference Signal (UL-RS), SRS, etc.) to improve the UTDOA locating accuracy or performance.

The beam information of the reference signal may include one or more of: the beam identifier of the reference signal, the beam direction of the reference signal, the beam width of the reference signal, the beam intensity of the reference signal, etc., and may also include the transmission time of the reference signal, etc.

The embodiments of the application may be applied to the Long Term Evolution (LTE) system, and may also be applied to the 5G system and its evolution system. The network devices involved in the embodiments of the application include the locating server, server management software (LuManager, LUM), base station, and so on. The locating server refers to Evolved Serving Mobile Location Center (E-SMLC) in the LTE system, and refers to Location Management Function (LMF) entity in the Next Generation Radio Access Network (NG-RAN). The base station refers to eNodeB in the LTE system, and refers to gNodeB in the 5G system.

Figure 1:
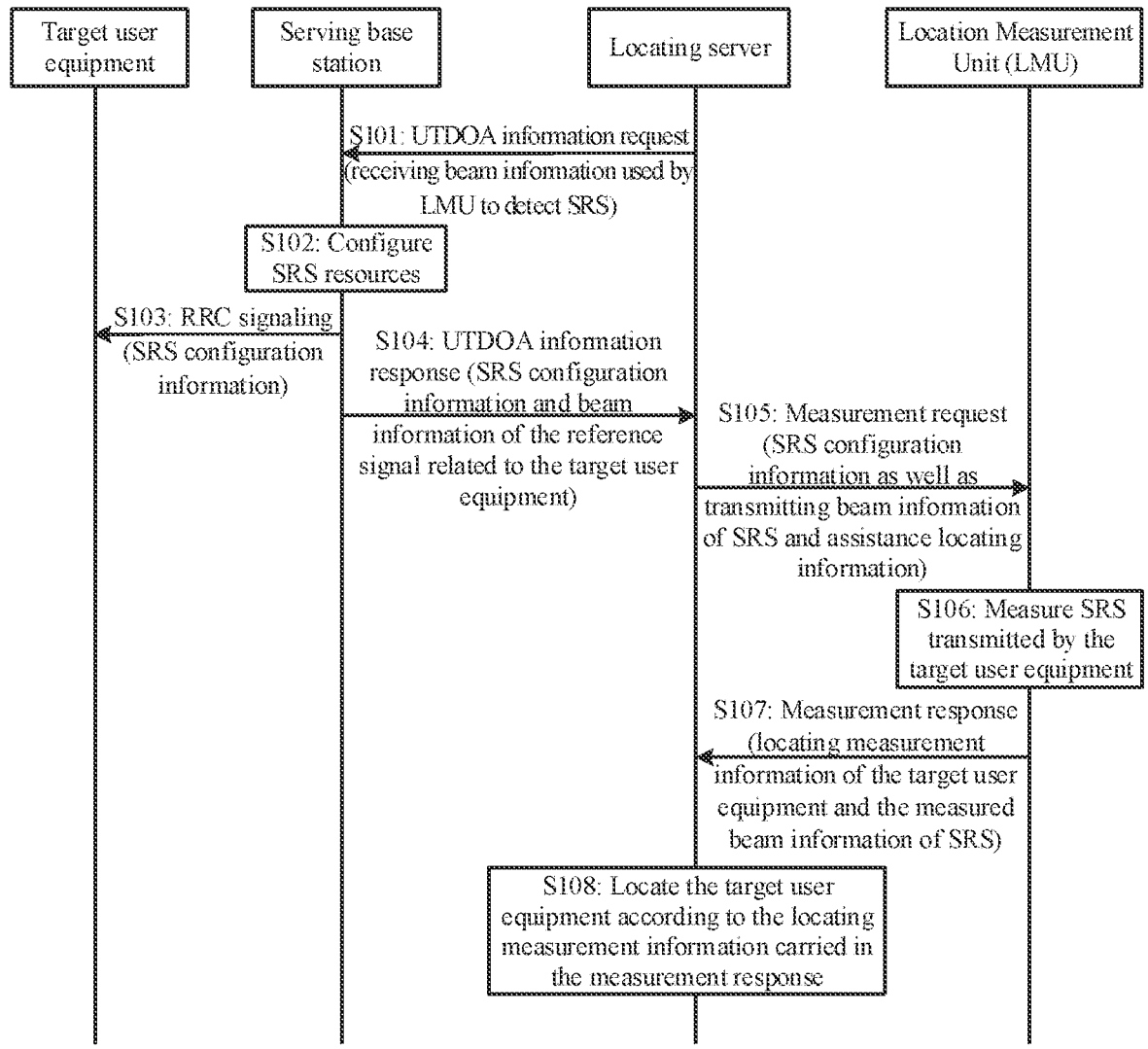
FIG. 1 is a schematic diagram of a UTDOA locating process according to an embodiment of the application.

Referring to FIG. 1, it is a schematic diagram of a UTDOA locating process according to an embodiment of the application.

In this process, the user equipment to be located is called the target user equipment. Before the target user equipment is located, the target user equipment has established a connection with the serving base station, that is, the target user equipment is in the Radio Resource Control CONNECTED (RRC_CONNECTED) state.

In the UTDOA locating process, the network side device detects the reference signal transmitted by the user equipment to realize the locating user equipment. The reference signal used for locating user equipment may include SRS or other reference signals. In the embodiment of the application, the SRS is taken as an example for description, and the embodiment of the application do not limit the type of the reference signal used to implement locating the user equipment.

After the target user equipment establishes a connection with the serving base station, the following process can be performed to achieve locating.

S101: a locating server transmits a UTDOA information request (UTDOA INFORMATION REQUEST) to the serving base station of the target user equipment.

The UTDOA information request can be mainly used in two aspects as follows: on one hand, it is used to request the serving base station to configure SRS resources for the target user equipment so that the target user equipment can transmit the SRS periodically to support the UTDOA locating; and on the other hand, it is used to request the serving base station to transmit the configuration information of the SRS configured for the target user equipment to the locating server.

Optionally, the UTDOA information request may carry the receiving beam information used by the LMU for detecting the SRS.

Optionally, the receiving beam information may include one or more of: the receiving beam direction of the SRS, the receiving beam width of the SRS, and the relationship between the receiving beam of the SRS and the receiving time of the SRS.

Optionally, the LMU is an LMU around the serving base station.

S102-S103: the serving base station receives the UTDOA information request, configures the resources of the location reference signal (such as SRS) for the target user equipment, and transmits the configuration information of the location reference signal (such as SRS) to the target user equipment through Radio Resource Control (RRC) signaling.

Optionally, when the UTDOA information request received by the serving base station carries the receiving beam information used by the LMU for detecting the SRS, the serving base station may configure the SRS resources for the target user equipment based on the receiving beam information of the SRS.

For example, the serving base station may configure the transmitting beam direction of the SRS of the target user equipment based on the receiving beam direction of the SRS, so that the transmitting beam direction of the SRS matches with the receiving beam direction, thereby improving the receiving performance of the SRS and thus improving the locating accuracy.

For another example, if the serving base station determines that the LMU receives the SRS in the beam scanning mode according to the receiving beam information used by the LMU for detecting the SRS carried in the UTDOA information request, the serving base station can configure the transmitting time and the beam direction of the SRS in reference with the beam information used by the LMU for receiving the SRS when configuring the SRS for the target user equipment, so that the time and beam direction of the target user equipment for transmitting the SRS match with the time and beam direction of the LMU for receiving the SRS.

After receiving the RRC signaling, the target user equipment can transmit the SRS periodically based on the SRS configuration. When the target user equipment is configured to transmit the SRS in the beam scanning mode, the beam direction of the target user equipment to transmit the SRS is related to the time to transmit the SRS.

S104: the serving base station transmits a UTDOA information response (UTDOA INFORMATION RESPONSE) to the locating server.

The UTDOA information response carries the configuration information of the SRS and the beam information of the reference signal related to the target user equipment.

Optionally, the beam information of the reference signal related to the target user equipment may include the transmitting beam information of the SRS as the location reference signal. In an implementation, the configuration information of the SRS carried in the UTDOA information response may also include the beam information of the SRS in addition to the SRS configuration information specified by the protocol.

The beam information of the reference signal related to the target user equipment may further include at least one of the followings.

The beam information of the Downlink Reference Signal (DL-RS) measured by the target user equipment. The beam information of the DL-RS may include the information such as the beam identifier and the beam direction of the DL-RS.

In an implementation, the user equipment in the connected state (RRC_CONNECTED state) measures the DL-RS periodically. The measured DL-RS may be a synchronization signal of an SSB (SS/PBCH block) or a Channel State Indication Reference Signal (CSI-RS) or other downlink reference signal. During the measurement process, the user equipment continuously reports the measurement result to the serving base station, and the serving base station transmits the DL-RS beam information reported by the user equipment to the locating server through a UTDOA information response.

Further, after receiving the UTDOA information response, the locating server can determine, by using use the beam information of the DL-RS carried in this response, the LMU used to detect the SRS transmitted by the target user equipment, that is, the locating server can determine which LMUs are near the target user equipment and should participate in the detection of the SRS transmitted by the target user equipment and which LMUs are far away from the target user equipment and cannot receive the SRS transmitted by the target user equipment and are not necessary to participate in the detection of the SRS transmitted by the target user equipment, so as to avoid the LMUs far away from the target user equipment and unable to receive the SRS transmitted by the target user equipment from participating in the detection of the SRS transmitted by the user equipment, and thus avoid wasting system resources.

Figure 2:
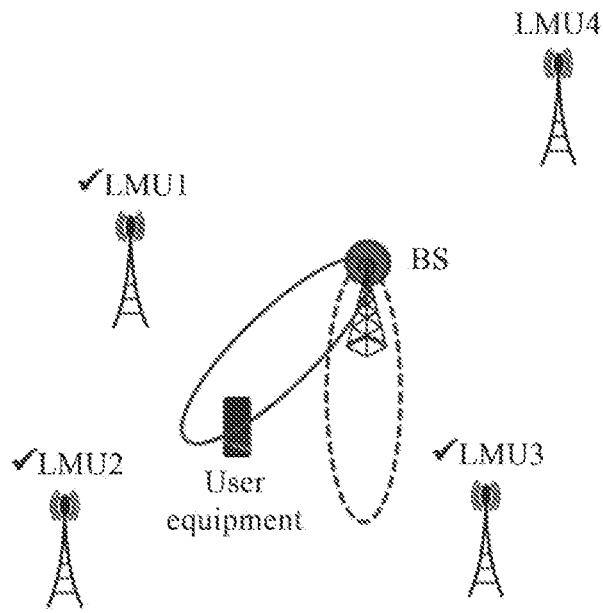
FIG. 2 is a schematic diagram of using the beam direction of the DL-RS of a user equipment to determine the LMU participating in detecting the SRS transmitted by the user equipment according to an embodiment of the application.

For example, as shown in FIG. 2, the LMU1, LMU2, and LMU3 are closer to the user equipment and should participate in detecting the SRS transmitted by the user equipment, w % bile the LMU4 is far away from the user equipment and need not participate in detecting the SRS transmitted by the user equipment.

The beam information of the Uplink Reference Signal (UL-RS) transmitted by the target user equipment and measured by the serving base station. The beam information of the UL-RS may include the information such as the beam identifier and the beam direction of the UL-RS.

During the data communication process between the user equipment in the connected state (RRC_CONNECTED state) and the serving base station, the serving base station can measure the Uplink Reference Signal (UL-RS) transmitted by the user equipment. The measured UL-RS may include a Demodulation Reference Signal (DM-RS) or a channel estimation reference signal. The serving base station may transmit the measured UL-RS beam information to the locating server through a UTDOA information response.

Further, after receiving the UTDOA information response, the locating server can determine, by using the beam information of the UL-RS carried in this response, the LMU used to detect the SRS transmitted by the target user equipment, that is, the locating server can determine which LMUs are near the target user equipment and should participate in the detection of the SRS transmitted by the target user equipment and which LMUs are far away from the target user equipment and cannot receive the SRS transmitted by the target user equipment and are not necessary to participate in the detection of the SRS transmitted by the target user equipment, so as to avoid the LMUs far away from the target user equipment and unable to receive the SRS transmitted by the target user equipment from participating in the detection of the SRS transmitted by the user equipment, and thus avoid wasting system resources.

S105: the locating server receives the UTDOA information response, and transmits a measurement request (MEASUREMENT REQUEST) to the LMU.

The measurement request is mainly used in two aspects as follows: on one hand, it is used to transmit the SRS configuration information of the target user equipment obtained from the serving base station to the LMU; and on the other hand, it requests the LMU to measure the SRS transmitted by the target user equipment.

The measurement request carries the SRS configuration information specified by the protocol, and may further carry the transmitting beam information of the SRS and the assistance locating information. The assistance locating information may include the beam information of the reference signal related to the target user equipment, or include the relative information between the transmitting beam of the SRS and the receiving beam used by the LMU determined according to the beam information of the reference signal related to the target user equipment.

The beam information of the reference signal related to the target user equipment may include the beam information of a downlink reference signal (DL-RS) measured by the target user equipment, and/or the beam information of an uplink reference signal (UL-RS) transmitted by the target user equipment and measured by the serving base station. The specific illustration can refer to S104.

In some embodiments, the locating server can directly use the transmitting beam information (such as beam direction, beam width, beam intensity, and other relevant information) of the SRS in the SRS configuration information carried in the UTDOA information response received from the serving base station as well as the DL-RS beam information (such as beam direction, beam width, beam intensity, etc.) of the user equipment carried in the UTDOA information response as the assistance locating information.

In other embodiments, the locating server can directly use the transmitting beam information (such as beam direction, beam width, beam intensity, and other relevant information) of the SRS in the SRS configuration information carried in the UTDOA information response received from the serving base station as well as the UL-RS beam information (such as beam direction, beam width, beam intensity, etc.) of the user equipment carried in the UTDOA information response as the assistance locating information.

In other embodiments, the locating server can determine the relative information between the transmitting beam of the SRS and the receiving beam used by the LMU (such as the transmitting beam direction of the SRS relative to the receiving beam direction used by the LMU) according to the transmitting beam information (such as beam direction, beam width, beam intensity, and other relevant information) of the SRS in the SRS configuration information carried in the UTDOA information response received from the serving base station as well as the DL-RS beam information (such as beam direction, beam width, beam intensity, etc.) of the user equipment carried in the UTDOA information response, and use the determined relative information between the transmitting beam of the SRS and the receiving beam used by the LMU as the assistance locating information.

In other embodiments, the locating server can determine the relative information between the transmitting beam of the SRS and the receiving beam used by the LMU (such as the transmitting beam direction of the SRS relative to the receiving beam direction used by the LMU) according to the transmitting beam information (such as beam direction, beam width, beam intensity, and other relevant information) of the SRS in the SRS configuration information carried in the UTDOA information response received from the serving base station as well as the UL-RS beam information (such as beam direction, beam width, beam intensity, etc.) of the user equipment carried in the UTDOA information response, and use the determined relative information between the transmitting beam of the SRS and the receiving beam used by the LMU as the assistance locating information.

S106, the LMU measures the location reference signal (such as SRS) transmitted by the target user equipment according to the information carried in the UTDOA information response to obtain the locating measurement information of the target user equipment.

Optionally, when the assistance information carried in the measurement request received by the LMU includes the transmitting beam information of the SRS and includes the DL-RS beam information or UL-RS beam information, the LMU may determine the relative position between the LMU and the serving base station or between the LMU and the target user equipment based on the approximate location of the serving base station or the target user equipment, determine the relative information between the transmitting beam of the SRS and the receiving beam used by the LMU (for example, the beam direction of the SRS relative to the beam direction of the LMU, etc.) according to the transmitting beam information of the SRS and the DL-RS beam information or UL-RS beam information, and measure the SRS transmitted by the target user equipment according to this information.

Optionally, when the assistance information carried in the measurement request received by the LMU is the relative information between the transmitting beam of the SRS and the receiving beam used by the LMU, the SRS transmitted by the target user equipment can be measured according to this information.

Figure 3:
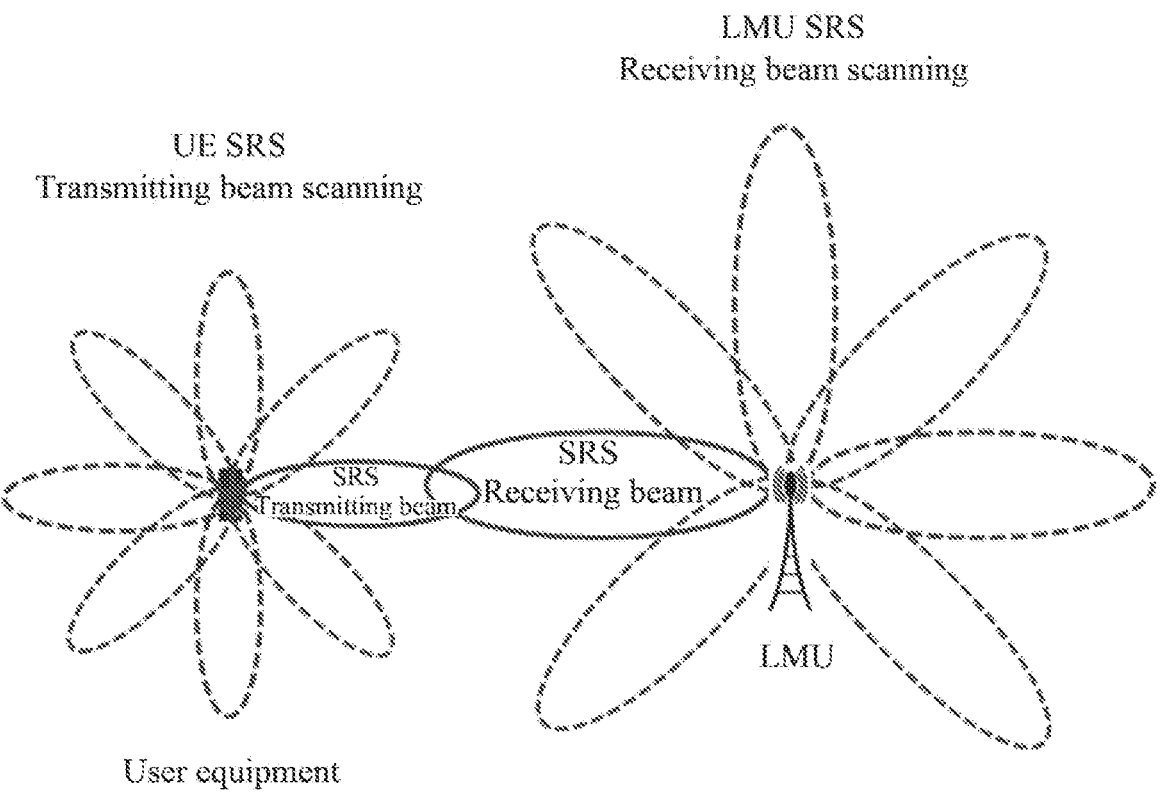
FIG. 3 is a schematic diagram in which the LMU uses the transmitting beam information of the SRS to determine the receiving beam of the SRS transmitted by the detected user equipment according to an embodiment of the application.

Optionally, the LMU may determine the receiving beam information of the LMU for the SRS according to the transmitting beam information of the SRS carried in the measurement request, so as to receive the SRS transmitted by the target user equipment. For example, as shown in FIG. 3, if the target user equipment transmits the SRS in the beam scanning mode, the LMU can determine the relationship between the beam transmission direction and transmission time of the SRS according to the transmitting beam information of the SRS carried in the measurement request, and can use this information to determine the receiving beam direction of the SRS, so as to reduce the time and power consumption required for the LMU to search for the SRS, and improve the detection reliability of the SRS and the measurement accuracy of the UL RTOA.

S107: the LMU transmits a measurement response (MEASUREMENT RESPONSE) to the locating server, where the measurement response carries the locating measurement information of the target user equipment and the measured beam information of the location reference signal (such as SRS).

The measurement response may be mainly used to report the measured uplink UL RTOA measurement value to the locating server, so that the locating server can locate the target user equipment according to the UL RTOA measurement value transmitted by the LMU.

In addition to the information specified by the protocol (such as the UL RTOA measurement value), the measurement response may optionally also carry other information related to the measured SRS beam, for example, the SRS beam identifier measured by the LMU and/or the SRS beam intensity measured by the LMU, etc.

S108: the locating server receives the measurement response, and locates the target user equipment according to the locating measurement information carried in the measurement response.

Optionally, in this step, the locating server can calculate the position of the target user equipment using the information such as beam direction, beam intensity and time difference of arrival (UL RTOA) of the SRS detected by the LMU, thereby making the locating more reliable and accurate.

Figure 4:
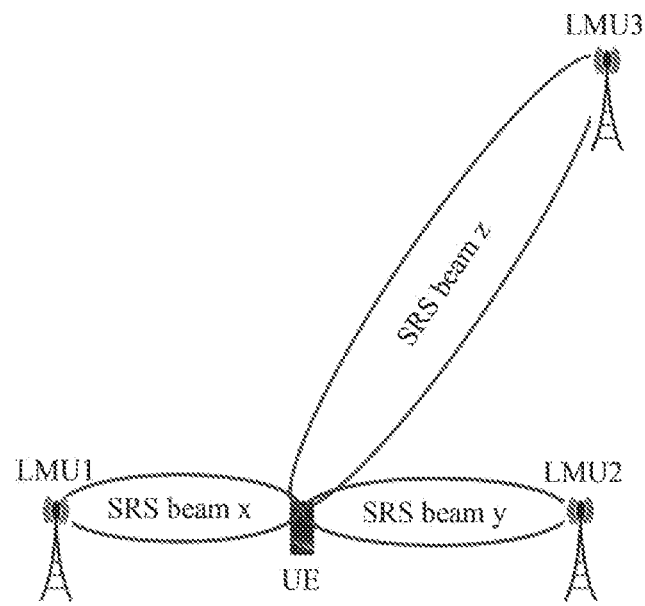
FIG. 4 is a schematic diagram of determining the position of a user equipment using the beam information according to an embodiment of the application.

As shown in FIG. 4, the LMU1, LMU2, and LMU3 respectively detect the SRS beam x, beam y and beam z from the UE. The UE is located in the overlapping area of the SRS beam x, beam y and beam z. The locating server can combine the beam direction and beam intensity of the SRS detected by the LMU with the UL RTOA measurement value to calculate the position of the UE in the locating algorithm, thereby improving the locating accuracy and reliability of the Observed Time Difference of Arrival (OTDOA) locating method.

It should be noted that there is no strict requirement on the time sequence relationship of the steps in the process shown in FIG. 1. For example, S103 and S104 can be executed at the same time, or S104 can be executed before S103.

It can be seen from the above description that the embodiments of the application can help to improve the UTDOA locating performance based on the beam information (for example, beam ID, beam direction, beam width, beam intensity, etc.) of uplink and downlink reference signals (including DL-RS, UL-RS, and SRS).

Based on the same technical concept, an embodiment of the application further provides a locating server.

Figure 5:
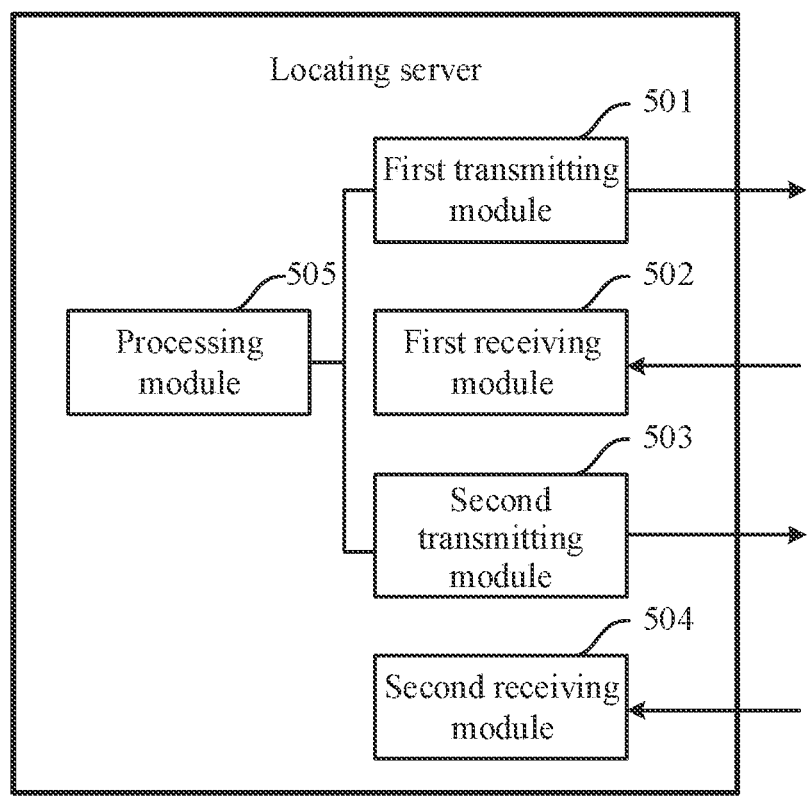
FIG. 5 is a schematic structural diagram of a locating server according to an embodiment of the application.

Referring to FIG. 5, which is the structure of the locating server according to the embodiment of the application, the locating server can implement the functions of the locating server side in the foregoing embodiments. As shown in the figure, the locating server may include: a first transmitting module 501, a first receiving module 502, a second transmitting module 503, a second receiving module 504, and a processing module 505.

The first transmitting module 501 is configured to transmit a UTDOA information request to a serving base station of a target user equipment; wherein the UTDOA information request is used to request the serving base station to configure resources of a location reference signal for the target user equipment and transmit configuration information of the location reference signal to the locating server.

The first receiving module 502 is configured to receive a UTDOA information response transmitted by the serving base station, wherein the UTDOA information response carries the configuration information of the location reference signal and beam information of a reference signal related to the target user equipment.

The second transmitting module 503 is configured to transmit a measurement request to a location measurement unit, wherein the measurement request carries assistance locating information; wherein the assistance locating information includes the beam information of the reference signal related to the target user equipment, or includes relative information between a transmitting beam of the location reference signal and a receiving beam used by the location measurement unit determined according to the beam information of the reference signal related to the target user equipment.

The second receiving module 504 is configured to receive a measurement response transmitted by the location measurement unit, wherein the measurement response carries locating measurement information of the target user equipment and measured beam information of the location reference signal, and the locating measurement information is obtained by the location measurement unit through measuring the location reference signal transmitted by the target user equipment according to the assistance locating information.

The processing module 505 is configured to locate the target user equipment according to the locating measurement information and the measured beam information of the location reference signal carried in the measurement response.

Optionally, the beam information of the reference signal related to the target user equipment includes transmitting beam information of the location reference signal and at least one of: beam information of a downlink reference signal measured by the target user equipment, and beam information of an uplink reference signal transmitted by the target user equipment and measured by the serving base station.

Optionally, after the first receiving module 502 receives the UTDOA information response transmitted by the serving base station, the processing module 505 determines a location measurement unit for detecting the location reference signal transmitted by the target user equipment according to the beam information of the downlink reference signal measured by the target user equipment.

Optionally, after the first receiving module 502 receives the UTDOA information response transmitted by the serving base station, the processing module 505 determines a location measurement unit for detecting the location reference signal transmitted by the target user equipment according to the beam information of the uplink reference signal transmitted by the target user equipment and measured by the serving base station.

Optionally, the UTDOA information request carries receiving beam information used by the location measurement unit to detect the location reference signal.

Based on the same technical concept, an embodiment of the application further provides a base station.

Figure 6:
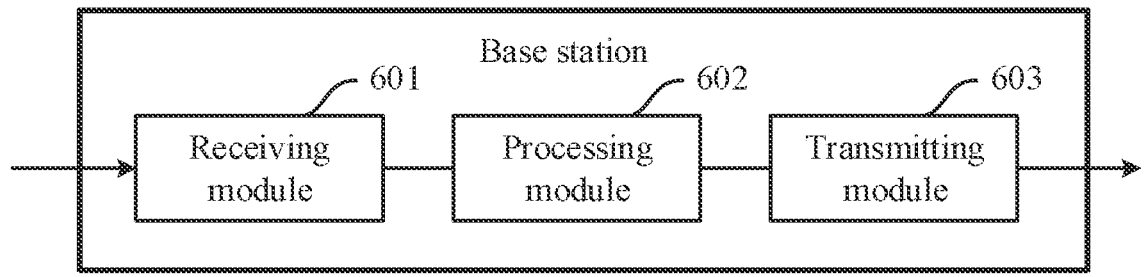
FIG. 6 is a schematic structural diagram of a base station according to an embodiment of the application.

Referring to FIG. 6, it is a schematic structural diagram of a base station according to the embodiment of the application. The base station can implement the functions of the base station side in the foregoing embodiments. As shown in the figure, the base station may include; a receiving module 601, a processing module 602, and a transmitting module 603.

The receiving module 601 is configured to receive a UTDOA information request transmitted by a locating server, wherein the UTDOA information request is used to request to configure resources of a location reference signal for a target user equipment and transmit configuration information of the location reference signal to the locating server.

The processing module 602 is configured to configure the resources of the location reference signal for the target user equipment.

The transmitting module 603 is configured to transmit a UTDOA information response to the locating server, wherein the UTDOA information response carries the configuration information of the location reference signal and beam information of a reference signal related to the target user equipment, and the configuration information of the location reference signal and the beam information of the reference signal related to the target user equipment are used to locate the target user equipment.

Optionally, the beam information of the reference signal related to the target user equipment includes transmitting beam information of the location reference signal and at least one of: beam information of a downlink reference signal measured by the target user equipment, and beam information of an uplink reference signal transmitted by the target user equipment and measured by the serving base station.

Optionally, the UTDOA information request carries receiving beam information used by the location measurement unit to detect the location reference signal. The processing module 602 is configured to: configure the resources of the location reference signal for the target user equipment according to the receiving beam information used by the location measurement unit to detect the location reference signal.

Based on the same technical concept, an embodiment of the application further provides a location measurement unit.

Figure 7:
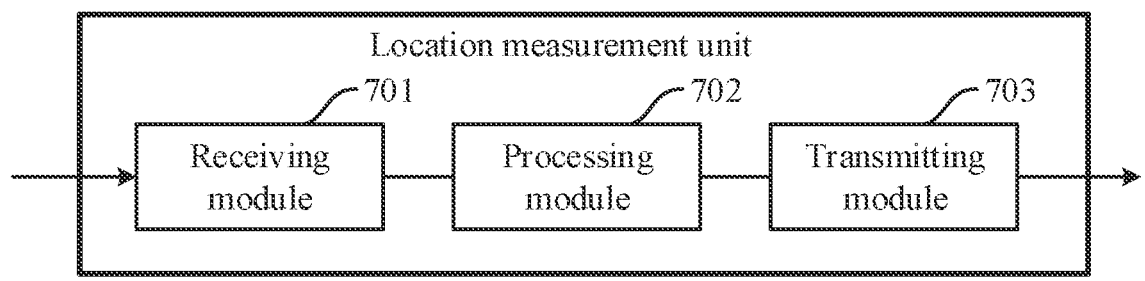
FIG. 7 is a schematic structural diagram of a location measurement unit according to an embodiment of the application.

Referring to FIG. 7, it is a schematic structural diagram of a location measurement unit according to the embodiment of the application. The location measurement unit can implement the functions of the location measurement unit side in the foregoing embodiments. As shown in the figure, the location measurement unit may include: a receiving module 701, a processing module 702, and a transmitting module 703.

The receiving module 701 is configured to receive a measurement request transmitted by a locating server, wherein the measurement request carries assistance locating information: wherein the assistance locating information includes beam information of a reference signal related to a target user equipment, or includes relative information between a transmitting beam of the location reference signal and a receiving beam used by the location measurement unit determined according to the beam information of the reference signal related to the target user equipment.

The processing module 702 is configured to measure the location reference signal transmitted by the target user equipment according to the assistance locating information to obtain locating measurement information of the target user equipment.

The transmitting module 703 is configured to transmit a measurement response to the locating server, wherein the measurement response carries the locating measurement information of the target user equipment and measured beam information of the location reference signal.

Optionally, after the receiving module 701 receives the measurement request transmitted by the locating server, the processing module 702 is further configured to: determine receiving beam information of the location reference signal according to transmitting beam information of the location reference signal carried in the measurement request.

Optionally, the beam information of the reference signal related to the target user equipment includes transmitting beam information of the location reference signal and at least one of: beam information of a downlink reference signal measured by the target user equipment, and beam information of an uplink reference signal transmitted by the target user equipment and measured by the serving base station.

Based on the same technical concept, an embodiment of the application further provides a communication device, which may be a locating server and can implement the functions implemented on the locating server side in the embodiments of the application.

Figure 8:
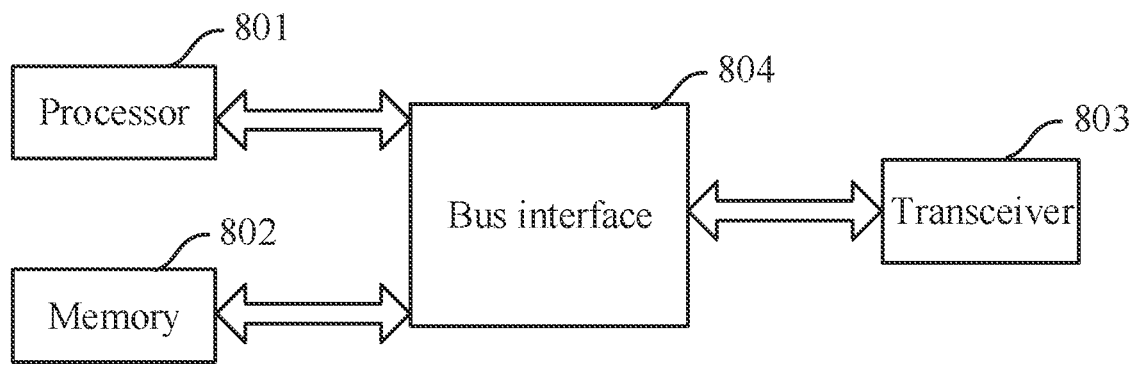
FIG. 8 to FIG. 10 are schematic structural diagrams of communication devices according to embodiments of the application respectively.

Referring to FIG. 8, it is a schematic structural diagram of a communication device according to an embodiment of the application. As shown, the communication device may include: a processor 801, a memory 802, a network interface 803, and a bus interface 804.

The processor 801 is responsible for managing the bus architecture and general processing, and the memory 802 may store the data used by the processor 801 when performing the operations. The network interface 803 is configured to receive and transmit data under the control of the processor 801.

The bus architecture may include any numbers of interconnected buses and bridges, and specifically link various circuits of one or more processors represented by the processor 801 and the memory represented by the memory 802. The bus architecture may further link various other circuits such as peripheral device, voltage regulator and power management circuit, which are all well known in the art and thus will not be further described again herein. The bus interface provides an interface. The processor 801 is responsible for managing the bus architecture and general processing, and the memory 802 may store the data used by the processor 801 when performing the operations.

The procedure disclosed by the embodiment of the application may be applied in the processor 801 or implemented by the processor 801. In the implementation process, each step of the signal processing flow may be completed by the integrated logic circuit of hardware in the processor 801 or the instruction in the form of software. The processor 801 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the application. The general-purpose processor may be a microprocessor or any conventional processor or the like. The steps of the method disclosed in combination with the embodiments of the application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 802, and the processor 801 reads the information in the memory 802 and completes the steps of the signal processing flow in combination with its hardwares.

The processor 801 is configured to read computer instructions in the memory 802 and execute the functions implemented on the locating server side in the process shown in FIG. 1.

Based on the same technical concept, an embodiment of the application further provides a communication device, which may be a base station and can implement the functions implemented on the base station side in the embodiments of the application.

Figure 9:
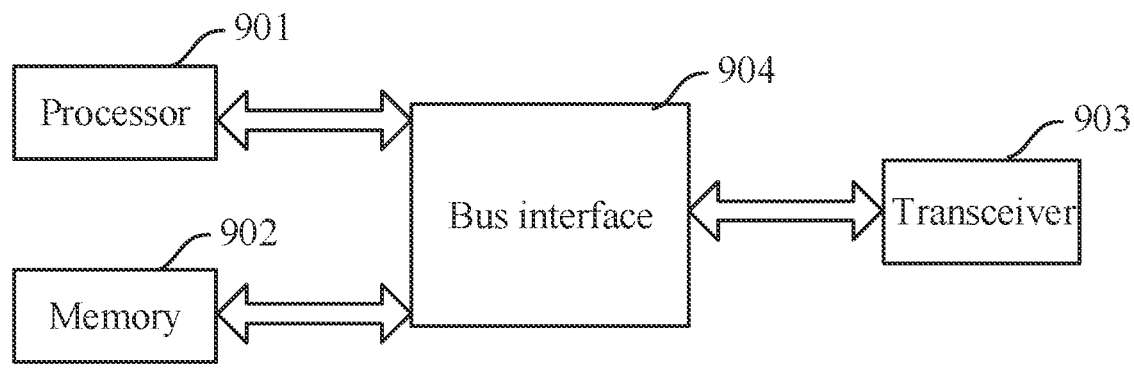

Referring to FIG. 9, it is a schematic structural diagram of a communication device according to an embodiment of the application. As shown, the communication device may include: a processor 901, a memory 902, a transceiver 903, and a bus interface 904.

The processor 901 is responsible for managing the bus architecture and general processing, and the memory 902 may store the data used by the processor 901 when performing the operations. The transceiver 903 is configured to receive and transmit data under the control of the processor 901.

The bus architecture may include any numbers of interconnected buses and bridges, and specifically link various circuits of one or more processors represented by the processor 901 and the memory represented by the memory 902. The bus architecture may further link various other circuits such as peripheral device, voltage regulator and power management circuit, which are all well known in the art and thus will not be further described again herein. The bus interface provides an interface. The processor 901 is responsible for managing the bus architecture and general processing, and the memory 902 may store the data used by the processor 901 when performing the operations.

The procedure disclosed by the embodiment of the application may be applied in the processor 901 or implemented by the processor 901. In the implementation process, each step of the signal processing flow may be completed by the integrated logic circuit of hardware in the processor 901 or the instruction in the form of software. The processor 901 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the application. The general-purpose processor may be a microprocessor or any conventional processor or the like. The steps of the method disclosed in combination with the embodiments of the application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 902, and the processor 901 reads the information in the memory 902 and completes the steps of the signal processing flow in combination with its hardwares.

The processor 901 is configured to read computer instructions in the memory 902 and execute the functions implemented on the base station side in the process shown in FIG. 1.

Based on the same technical concept, an embodiment of the application further provides a communication device, which may be a location measurement unit and can implement the functions implemented on the location measurement unit side in the embodiments of the application.

Figure 10:
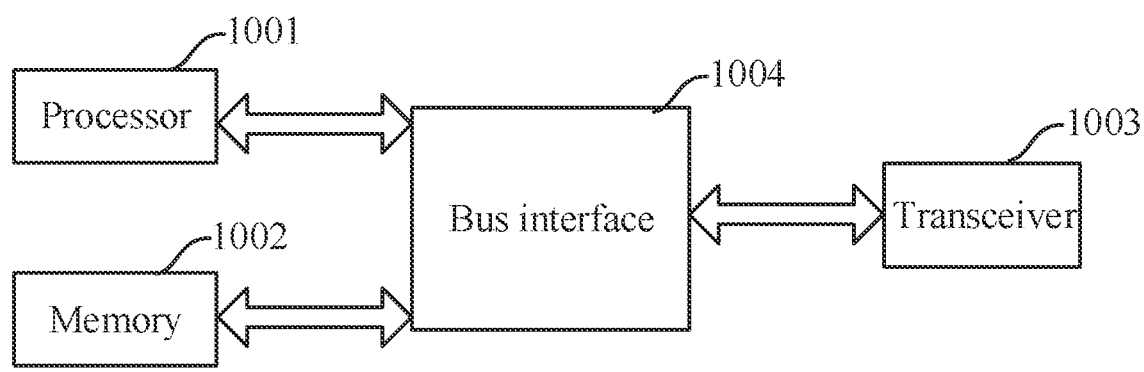

Referring to FIG. 10, it is a schematic structural diagram of a communication device according to an embodiment of the application. As shown, the communication device may include: a processor 1001, a memory 1002, a network interface 1003, and a bus interface 1004.

The processor 1001 is responsible for managing the bus architecture and general processing, and the memory 1002 may store data used by the processor 1001 when performing the operations. The network interface 1003 is configured to receive and transmit data under the control of the processor 1001.

The bus architecture may include any numbers of interconnected buses and bridges, and specifically link various circuits of one or more processors represented by the processor 1001 and the memory represented by the memory 1002. The bus architecture may further link various other circuits such as peripheral device, voltage regulator and power management circuit, which are all well known in the art and thus will not be further described again herein. The bus interface provides an interface. The processor 1001 is responsible for managing the bus architecture and general processing, and the memory 1002 may store the data used by the processor 1001 when performing the operations.

The procedure disclosed by the embodiment of the application may be applied in the processor 1001 or implemented by the processor 1001. In the implementation process, each step of the signal processing flow may be completed by the integrated logic circuit of hardware in the processor 1001 or the instruction in the form of software. The processor 1001 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the application. The general-purpose processor may be a microprocessor or any conventional processor or the like. The steps of the method disclosed in combination with the embodiments of the application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1002, and the processor 1001 reads the information in the memory 1002 and completes the steps of the signal processing flow in combination with its hardware.

The processor 1001 is configured to read computer instructions in the memory 1002 and execute the functions implemented on the location measurement unit side in the process shown in FIG. 1.

Based on the same technical concept, an embodiment of the application further provides a computer readable storage medium. The computer readable storage medium stores computer executable instructions that are configured to cause the computer to perform the process executed by the locating server in FIG. 1.

Based on the same technical concept, an embodiment of the application further provides a computer readable storage medium. The computer readable storage medium stores computer executable instructions that are configured to cause the computer to perform the process executed by the base station in FIG. 1.

Based on the same technical concept, an embodiment of the application further provides a computer readable storage medium. The computer readable storage medium stores computer executable instructions that are configured to cause the computer to perform the process executed by the location measurement unit in FIG. 1.

The application is described by reference to the flow charts and/or the block diagrams of the methods, the devices (systems) and the computer program products according to the embodiments of the application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the application.

Evidently those skilled in the art can make various modifications and variations to the application without departing from the spirit and scope of the application. Thus the application is also intended to encompass these modifications and variations therein as long as these modifications and variations to the application come into the scope of the claims of the application and their equivalents.

What is claimed is:

1. A locating method for an uplink time difference of arrival, comprising:

transmitting, by a locating server, an Uplink Time Difference of Arrival, UTDOA, information request to a serving base station of a target user equipment; wherein the UTDOA information request is used to request the serving base station to configure resources of a location reference signal for the target user equipment and transmit configuration information of the location reference signal to the locating server;

receiving, by the locating server, a UTDOA information response transmitted by the serving base station, wherein the UTDOA information response carries the configuration information of the location reference signal and beam information of a reference signal related to the target user equipment;

transmitting, by the locating server, a measurement request to a location measurement unit, wherein the measurement request carries assistance locating information; wherein the assistance locating information comprises the beam information of the reference signal related to the target user equipment, or comprises relative information between a transmitting beam of the location reference signal and a receiving beam used by the location measurement unit determined according to the beam information of the reference signal related to the target user equipment;

receiving, by the locating server, a measurement response transmitted by the location measurement unit, wherein the measurement response carries locating measurement information of the target user equipment and measured beam information of the location reference signal, and the locating measurement information is obtained by the location measurement unit through measuring the location reference signal transmitted by the target user equipment according to the assistance locating information;

locating, by the locating server, the target user equipment according to the locating measurement information and the measured beam information of the location reference signal carried in the measurement response.

2. The method of claim 1, wherein the beam information of the reference signal related to the target user equipment comprises transmitting beam information of the location reference signal and at least one of:
   beam information of a downlink reference signal measured by the target user equipment;
   beam information of an uplink reference signal transmitted by the target user equipment and measured by the serving base station.

3. The method of claim 2, wherein after the locating server receives the UTDOA information response transmitted by the serving base station, the method further comprises:
   determining, by the locating server, a location measurement unit for detecting the location reference signal transmitted by the target user equipment according to the beam information of the downlink reference signal measured by the target user equipment.

4. The method of claim 2, wherein after the locating server receives the UTDOA information response transmitted by the serving base station, the method further comprises:
   determining, by the locating server, a location measurement unit for detecting the location reference signal transmitted by the target user equipment according to the beam information of the uplink reference signal transmitted by the target user equipment and measured by the serving base station.

5. The method of claim 1, wherein the UTDOA information request carries receiving beam information used by the location measurement unit to detect the location reference signal.

6. The method of claim 1, wherein the beam information comprises one or more of:
   beam identifier;
   beam direction;
   beam width;
   beam intensity.

7. The method of claim 1, wherein the location reference signal is a Sounding Reference Signal, SRS.

8. A locating method for an uplink time difference of arrival, comprising:
   receiving, by a serving base station of a target user equipment, an Uplink Time Difference of Arrival, UTDOA, information request transmitted by a locating server, wherein the UTDOA information request is used to request to configure resources of a location reference signal for the target user equipment and transmit configuration information of the location reference signal to the locating server;
   configuring, by the serving base station, the resources of the location reference signal for the target user equipment;
   transmitting, by the serving base station, a UTDOA information response to the locating server, wherein the UTDOA information response carries the configuration information of the location reference signal and beam information of a reference signal related to the target user equipment, and the configuration information of the location reference signal and the beam information of the reference signal related to the target user equipment are used to locate the target user equipment.

9. The method of claim 8, wherein the beam information of the reference signal related to the target user equipment comprises transmitting beam information of the location reference signal and at least one of:
   beam information of a downlink reference signal measured by the target user equipment;
   beam information of an uplink reference signal transmitted by the target user equipment and measured by the base station.

10. The method of claim 8, wherein the UTDOA information request carries receiving beam information used by the location measurement unit to detect the location reference signal;
    configuring, by the serving base station, the resources of the location reference signal for the target user equipment, comprises:
    configuring, by the serving base station, the resources of the location reference signal for the target user equipment according to the receiving beam information used by the location measurement unit to detect the location reference signal.

11. The method of claim 8, wherein the beam information comprises one or more of:
    beam identifier;
    beam direction;
    beam width;
    beam intensity.

12. The method of claim 8, wherein the location reference signal is a Sounding Reference Signal, SRS.

13. A locating method for an uplink time difference of arrival, comprising:
    receiving, by a location measurement unit, a measurement request transmitted by a locating server, wherein the measurement request carries assistance locating information; wherein the assistance locating information comprises beam information of a reference signal related to a target user equipment, or comprises relative information between a transmitting beam of the location reference signal and a receiving beam used by the location measurement unit determined according to the beam information of the reference signal related to the target user equipment;
    measuring, by the location measurement unit, the location reference signal transmitted by the target user equipment according to the assistance locating information to obtain locating measurement information of the target user equipment;
    transmitting, by the location measurement unit, a measurement response to the locating server, wherein the measurement response carries the locating measurement information of the target user equipment and measured beam information of the location reference signal.

14. The method of claim 13, wherein after the location measurement unit receives the measurement request transmitted by the locating server, the method further comprises:
determining, by the location measurement unit, receiving beam information of the location reference signal according to transmitting beam information of the location reference signal carried in the measurement request.

15. The method of claim 13, wherein the beam information of the reference signal related to the target user equipment comprises transmitting beam information of the location reference signal and at least one of:
beam information of a downlink reference signal measured by the target user equipment;
beam information of an uplink reference signal transmitted by the target user equipment and measured by the serving base station.

16. The method of claim 14, wherein the beam information comprises one or more of:
beam identifier;
beam direction;
beam width;
beam intensity.

17. The method of claim 14, wherein the location reference signal is a Sounding Reference Signal, SRS.

18. A communication device, comprising: a processor and a memory; wherein the processor is configured to read computer instructions in the memory to perform the method according to claim 1.

19. A communication device, comprising: a processor, a memory and a transceiver; wherein the processor is configured to read computer instructions in the memory to perform the method according to claim 8.

20. A communication device, comprising: a processor and a memory; wherein the processor is configured to read computer instructions in the memory to perform the method according to claim 13.

* * * * *